June 16, 1953 — R. H. SAWYER — 2,642,339
PROCESS FOR OXIDIZING IRON HALIDES TO
PRODUCE IRON OXIDE AND CHLORINE
Filed Nov. 6, 1948
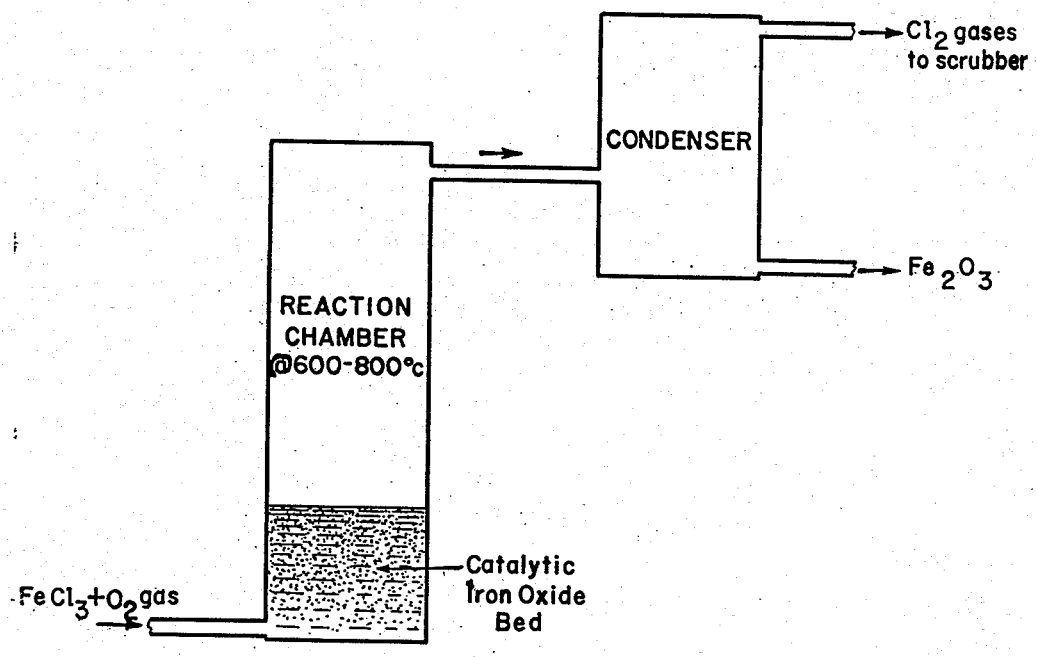
INVENTOR
Roscoe H. Sawyer
BY
ATTORNEY

UNITED STATES PATENT OFFICE 2,642,339

PROCESS FOR OXIDIZING IRON HALIDES TO PRODUCE IRON OXIDE AND CHLORINE

Roscoe H. Sawyer, Christiana, Del., assignor to E. I. du Pont de Nemours & Company, Wilmington, Del., a corporation of Delaware Application November 6, 1948, Serial No. 58,791

1 Claim. (Cl. 23—200)

This invention relates to the oxidation of iron halides to form iron oxides and free halogens. More particularly, it pertains to the production of finely-divided iron oxide through the vapor phase oxidation of iron halides, such as ferrous or ferric chlorides, and by means of fluidized catalytic solids techniques.

Iron oxides can be prepared commercially by several known methods. Thus, iron chloride may be reacted in the vapor phase with air to form iron oxide and free chlorine. Instead of air, water vapor may be used for purposes of hydrolyzing the chloride. Alternatively, the reacting vapors can be brought in contact with a gaseous, carbonaceous fuel and the latter burned to initiate the desired oxidation reaction. Major difficulties are encountered in these prior processes which render them uneconomical and non-attractive for commercial or general use. For instance, the iron oxides which form therein tend to adhere to the internal surfaces of the reactor, build up thereon, and eventually plug the system. Again, the rates of reaction are so slow that an attempt at acceleration must be resorted to. This requires careful, external heating of the reactor and to an excessive, high order of temperature, despite the fact that the reaction itself is exothermic. For these and other reasons, prior procedures entail comparatively costly, non-continuous types of operations requiring frequent interruptions due to clean out and reconditioning of plant equipment.

It is among the objects of this invention to overcome these and other disadvantages of prior processes for iron oxide and free halogen production, and to provide, in particular, a novel, improved method for producing iron oxides and free halogen gases through the vapor phase oxidation of iron halides. An additional, specific object is to provide a continuous, relatively simple and economical method, readily adaptable to commercial large-scale exploitation, for producing finely-divided iron oxide as well as free chlorine from iron chloride vapors. Further objects include the prevention or minimization of solid reaction products build-up in the oxidation unit, and the acceleration, by means of an in-situ-formed catalyst, of the rate of oxidation reaction between iron halides and an oxygen-containing gas. Other objects and advantages of the invention will be evident from the ensuing description and the accompanying diagrammatic drawing illustrating an application of the invention.

These and other objects are accomplished by this invention which comprises subjecting an iron halide to vapor phase oxidation in the presence of catalytic iron oxide and while said oxide is maintained in the form of a fluidized bed within the reaction zone.

In a more specific and preferred embodiment, the invention comprises continuously reacting in a reaction zone vaporous iron chloride with an oxygen-containing gas, such as air, at temperatures ranging from at least 400° C. to not to exceed 900° C., and effecting said reaction in the presence of a fluidized mass suspension of solid particles containing catalytic iron oxide, which particles are maintained in constant motion within said zone by continuously passing one or both of said reactants upwardly through said mass, and thereafter continuously withdrawing the products of reaction from said zone for separation and recovery.

In one practical adaptation of the invention, an iron halide such as, preferably, ferrous or ferric chloride, in the gaseous state, is introduced, either alone or in admixture with an oxidizing gas, such as air, oxygen, or oxygen-enriched air, etc., into the lower portion of a vertical, elongated, conventional type of reaction vessel which permits a continuous flow of reactants and products through its reaction zone. Such vessel consists, preferably, of a corrosion-resistant material, such as fire clay, silica, quartz, etc., or comprises an external shell consisting of a suitable metal provided with an internal liner made up of a corrosion-resistant substance of the type mentioned to impart desired stability and resistance towards chlorine or high temperature attack. Suitably disposed within the lower portion of the reaction zone of the vessel a pervious bed or layer of hot, finely-divided catalytic iron oxide is provided for a purpose to be presently described. The iron halide or oxidizing gas reactant, or both, can be continuously injected or otherwise fed into the reaction vessel and its reaction zone while the latter is maintained at, preferably, temperatures ranging from 600–800° C. Such introduction is also effected in such manner that one or both of the reactants will pass upwardly through said zone and the body of catalytic iron oxide maintained therein. Furthermore, such controlled, regulated feed rates are resorted to that the iron oxide particle become suspended in the fluid or gaseous reaction mixture within said zone to form a fluidized bed which is maintained in constant motion and circulation therein. By this means there is obtained a direct, more intimate contact and heat distribution between the vapor phase reactants and the catalytic iron oxide particles which continues throughout and until completion of the desired reaction. The iron oxide particles not only induce desired acceleration of the vapor phase oxidation reaction between the halide and oxidizing medium by their catalytic effect, but their continuous motion and circulation cause them to be forcibly thrown about and against the internal walls or surfaces of the reactor so that any adhering solid reaction products become knocked off, dislodged, or otherwise removed from the reaction zone surfaces. As a consequence, such surfaces are maintained in relatively clean, scoured state by means of the inert iron oxide and objectionable reaction product build-up within the reactor, with its consequent ultimate plugging and stoppage of the apparatus, is advantageously minimized or altogether prevented.

In accomplishing this two-fold purpose of reaction acceleration and cleaning effect, resort is preferably had to the use of such gas velocities that the iron oxide particles will be in free and rapid motion within and throughout the reaction chamber, but will not be blown out of said chamber in any appreciable amount. Maintenance of the oxide particles in such state of fluidity subjects the walls of the chamber to a frequent and powerful hitting or abrading action by such particles and hence affords an efficient scouring or cleaning action. The more even distribution of the particles provides a more even and rapid heat distribution as well as more intimate and rapid mixing and greatly enhances the catalytic effect of the particles. Gas velocities of the order of from about 0.2 foot to 2.0 feet per second will be found to be generally satisfactory for this purpose where the bed particles utilized are about the size of fine beach sand, with a more narrow range of from about 0.5 foot to 1 foot per second being preferred for use in such instance. The iron oxide which newly forms in the reaction may in part adhere to the suspended particles and remain in the reactor, and, in part, may be carried out of the reaction vessel by the effluent gases for collection in a separate unit. At the same time, chlorine is freed from its chemical combination with the iron and passes out of the reaction zone for like subsequent recovery.

To a clearer understanding of the invention, the following illustrative example is given:

*Example*

In a vertical reaction vessel, consisting of a silica tube 6 ft. high and having an inside diameter of 3⅛ in. were placed as a catalytic bed material 6.84 kilograms of iron oxide having a 35+100 mesh particle size. Cool air, dried by passage through activated alumina to a dew point of —40° C., was used as the oxidizing gas. Solid, finely-divided ferric chloride was fed into the air line leading into the reaction vessel and just before its entry into the base of said reactor. A feed rate sufficient to give 0.1 pound of ferric chloride per 0.775 cu. ft. of air, i. e., a ratio of 1.6 pounds $FeCl_3$ per pound of air, was employed. The air-ferric chloride mixture was injected upwardly through the reactor and into the iron oxide bed at a rate equivalent to approximately 1 ft. per second on the empty tube, forcing the bed particles into motion and circulating them freely to a height of about 3 ft. in the tube. With air calculated as 21% by volume of $O_2$, 97% of the stoichiometric requirement for combination with $FeCl_3$ was thus employed. The reaction chamber was externally heated to a temperature of about 800° C. The reacting gases had an average retention time therein of 6 seconds. The exit gases analyzing 25.7% by volume chlorine and 4.4% oxygen were passed through a conventional type condenser and subsequently through a suitable caustic scrubber. Fine particle size iron oxide was recovered from the condenser. Following the run, the new weight of the bed material was found to be 7.22 kilograms, showing retention by the bed of 0.38 kilogram of product iron oxides. Of the total iron oxide produced, 68% thus adhered to the bed, to be recovered as relatively coarse iron oxide, suitable for pigment and the like, while 32% was blown out into the condenser as fines. Conversion was found to be 62%, whereas theoretical is about 82%.

The reactor, after use, was dismantled and its internal surfaces on being examined were found to be free from any substantial build-up of adhering iron oxide. In a control experiment in which the reactor was maintained at 800° C. as above, but in which no fluid bed of iron oxide was used as a catalyst and scouring agent, objectionable oxides deposition took place on the walls and jets of the reactor sufficient in extent to induce ultimate plugging of the apparatus. Additionally, it was necessary to retain the reactants within the chamber for 60 seconds, in order to achieve a degree of conversion comparable to that before achieved with the three-foot bed, i. e., 65% conversion.

While the invention has been described above as applied to certain specific and preferred embodiments, it is obvious that it is not restricted thereto and that due variance may be made therefrom without departing from its underlying spirit and scope. Thus, the type of bed, the reaction temperatures employed and the time of retention of the reactants in the oxidation chamber are interdependent and may be variously regulated. Using the oxidation of ferric chloride as an example, the reaction may be written:

$$2FeCl_3 + 1\frac{1}{2}O_2 \rightleftharpoons Fe_2O_3 + 3Cl_2$$

This is a gas phase reaction and $Fe_2O_3$, being a solid, has no effect on the equilibrium relation. This latter may be expressed by the constant "K" which equals $$\frac{[Cl_2]^3}{[FeCl_3]^2[O_2]1.5}$$

Under calculated theoretical equilibrium conditions at various temperatures for stoichiometric proportions, it will be found that the lower the temperature, the more complete the conversion to iron oxide. At about 400° C. and with infinite retention time, the reaction should be 100%. However, this is of course impractical to attain. The use of the iron oxide catalytic bed, in accordance with this invention, will be found to allow the closest approach to these theoretical conditions and will shorten drastically the retention time required to obtain a given yield of iron oxide at a given temperature. For instance, with a commercially feasible retention time of, say, 10 seconds and using an iron oxide bed, as herein contemplated, reaction temperatures of from 650° C. to 750° C. will provide about 85% conversion. To achieve these results utilizing the same temperature range but without a bed, it will be found necessary that the reactants be retained in the oxidation chamber more than ten times as long.

The relative quantities of the reacting gases also may be widely varied, although nearly stoichiometric proportions are usually desirable and preferred. In the oxidation of ferric chloride with air the stoichiometric ratio is approximately 1½ pounds FeCl₃: 1 pound of air. This gives theoretically 100% conversion to ferric oxide and about 34% by volume of free chlorine in the effluent gases. Excess oxygen-containing gases may be used, in which case the tail gases will be diluted but complete recovery of the iron in its oxide form is assured. Excess iron halide can also be used, when a high purity of free halogen gas is recovered but some iron remains unreacted. Again, the exact conditions employed depend upon the products desired.

While ferric chloride and ferrous chloride, or mixtures thereof, comprise preferred types of reactants in the vapor phase oxidation process herein contemplated, other vaporizable types of anhydrous iron halides, particularly those in which the halogen element has an atomic number greater than 9, or mixtures thereof, can also be used. Among examples of such additionally utilizable halides may be mentioned ferric and ferrous iron bromide; ferrous and ferric iron iodide, etc. The fluorides are non-practical and not contemplated for use because their oxidation, being an endothermic reaction, requires the application of a commercially non-feasible amount of heat. The contemplated iron halide reactions are exothermic and hence proceed in an efficient, satisfactory manner. In forming ferric oxide from ferric chloride, for example, 6 kilocalories of heat per mol of iron are released; while 8 kilocalories are released from ferric bromide. As already indicated and due to their greater availability and cheapness, the iron chlorides are preferred for use.

The iron halide reactant can be added to the reactor as a solid, fluidized in a stream of cold oxidizing gas; or it can be preheated and vaporized prior to its introduction into the reactor, either separately or with the oxidizing gas. In the latter instance, the oxidizing gas must also be preheated if the reactants should be mixed prior to entry into the reactor; otherwise, the one gas, being cold, may undesirably condense some of the halide vapor. Thermodynamic calculations for ferric chloride oxidation indicate that with the chloride vapor at 400° C. and the air preheated to 875° C., a good reaction temperature of 700° C. is obtained.

As alluded to hereinbefore, when employing hot air and ferric chloride vapors, initiation of the reaction and preheating of the bed material can be effected by first burning coal, producer gas, oil, or other combustible within the reactor or heating it through other desired internal or external means to raise its temperature to the desired 400–900° C. range. Thereafter, introduction of the reactants can be continuously effected and the reaction allowed to proceed without further heat addition, due to its exothermic character. Alternatively, heat sufficient to initiate the reaction may be supplied by preheating the catalytic iron oxide particles prior to their introduction and use in the reactor and to a temperature sufficiently high to induce the desired reaction upon subsequent introduction of the reactants. Again, the halide or oxidizing gas reactant can be separately heated prior to introduction and likewise to a temperature sufficiently high to induce the desired reaction upon such reactants being charged into the reaction zone.

Various oxygen-containing gases may be used, although air is generally the cheapest and most easily obtained. Pure oxygen gives a product gas of greater purity since it is not diluted with nitrogen, etc., and less equipment is necessary to recover the free halogen therefrom. Oxygen-enriched air is also satisfactory. It is undesirable to allow much moisture to be present in the oxidizing gas, particularly when the iron compound is mixed as a solid therein. The iron halides are highly hygroscopic, and if appreciable water were present, their consequent hydrolysis would quickly foul the system. Furthermore, moisture causes the formation of HCl so that free chlorine may be lost. It is preferable to dry the gases, at least in part. Where the iron halide is added as a solid, it may be fluidized in some of the dry gas, and normal undried gas added separately to the reactor after the halide is vaporized.

The invention is readily and particularly adaptable to a continuous operation for commercially producing both iron oxides and gaseous halogens. Thus, a satisfactory process comprises fluidizing solid iron halides in dry air or oxygen and injection of the mixture into a bed of iron oxide particles maintained at a suitable reaction temperature. The iron oxide becomes fluidized, and the reaction between the gases proceeds as usual. The iron oxide fines are blown over into a cyclone separator where they are recovered, and the gas removed to another recovery system. Any iron halide remaining unreacted may be cooled and condensed from this gas and can be returned to the iron halide feeder. As the coarser iron oxide product builds up on the bed, it can be bled off for other commercial uses, while fresh iron oxide material can be fed to the system into a line through which a highly-heated flue gas is passing and in which the oxide material becomes entrained. The iron oxide is thereby heated and passes into a suitable cyclone separator for discharge therefrom in such heated state to the oxidation reactor to effect replenishing of the fluidized catalytic bed.

The many advantages of the invention will be apparent from the above description. Free halogen gases are readily recovered from their chemical combination with iron, while iron oxides are produced in either large or fine particle sizes for any desired commercial use. Both results are achieved in markedly less time and with markedly greater efficiency and higher yields than is possible from prior iron halide oxidation processes. This arises from the novel combination of a chemical action, catalysis, mechanical action, and scouring effect in the reactor system which novel use of an iron oxide fluidized bed in this invention affords.

The bed material, it will be understood, need not comprise iron oxide alone, but may consist initially of a mixture of that material with a minor proportion of a finely-divided, completely foreign inert substance, such as silica (sand) or the like, also capable of being suspended in the reaction zone and of inducing a desired abrading or cleaning action upon the internal surfaces of that zone. As the reaction proceeds, such inert substance will soon be coated with iron oxide formed during the oxidation and thus provide an optimum form of catalytic bed and effect. While the use and presence of an inert substance in addition to iron oxide is contemplated, pure iron oxide use is generally preferred in commercial operations to insure optimum catalysis being obtained. Any reasonable quantity or size of bed particles can be resorted to and the particles may be varied in accordance with the particular conditions desired. These factors are interdependent with the gas velocities resorted to. Obviously, the larger the particle size or quantity of the bed used, the greater will be the required velocity of the gaseous reactants resorted to in setting the material in motion.

I claim as my invention:

A continuous process for producing iron oxide and a chlorine-containing gas, comprising reacting ferric chloride with dry air, conducting the reaction in the vapor phase at temperatures of from 600–800° C. and in a vertical reaction zone containing a bed of finely-divided catalytic iron oxide having a particle size within the range of 35 to 100 mesh, introducing said chloride and air reactants at a gas velocity of 0.5 to 1 ft./sec. and in the ratio of 1.6 pounds of ferric chloride per pound of air into the lower portion of said reaction zone for retention therein for a period of not to exceed 10 seconds for passage upwardly therethrough and to suspend the particles of said bed as a fluidized mass maintained in such constant, turbulent motion and velocity that said particles scour the internal surfaces of the reaction zone and prevent substantial deposition of reaction product thereon, and thereafter removing and recovering from said zone the resulting iron oxide and chlorine products of reaction.

ROSCOE H. SAWYER.

References Cited in the file of this patent

UNITED STATES PATENTS

| Number | Name | Date |
| --- | --- | --- |
| 1,435,928 | Kipper | Nov. 21, 1922 |
| 1,552,786 | Westcott | Sept. 8, 1925 |
| 1,850,286 | Mittasch et al. | Mar. 22, 1932 |
| 1,917,229 | Bacon et al. | July 11, 1933 |
| 1,984,380 | Odell | Dec. 18, 1934 |
| 1,994,367 | Millar | Mar. 12, 1935 |
| 2,367,694 | Snuggs | Jan. 23, 1945 |
| 2,436,870 | Murphree | Mar. 2, 1948 |
| 2,446,221 | Ferguson | Aug. 3, 1948 |

FOREIGN PATENTS

| Number | Country | Date |
| --- | --- | --- |
| 513,947 | Great Britain | Oct. 26, 1939 |

OTHER REFERENCES

Kite et al., "Chem. and Met. Eng.," vol. 54, No. 12, pages 112–115 (1947).